F. EICHBERG.
ALTERNATING CURRENT MOTOR.
APPLICATION FILED APR. 19, 1907.

936,615.

Patented Oct. 12, 1909.
2 SHEETS—SHEET 1.

WITNESSES:
Lester H. Fulmer.
J. Ellis Glen

INVENTOR
FRIEDRICH EICHBERG.
BY
ATT'Y.

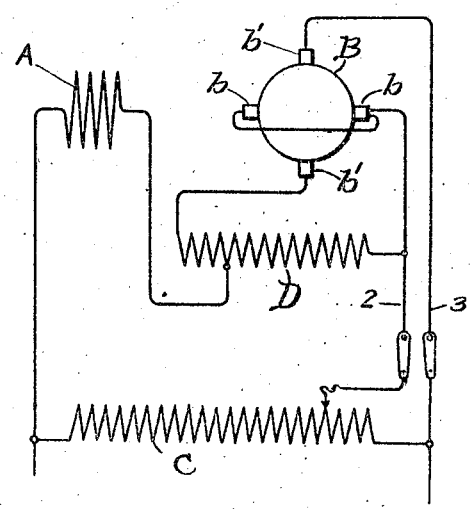
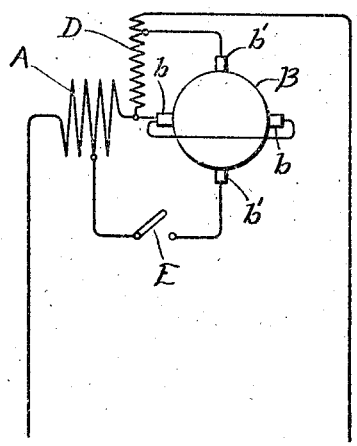
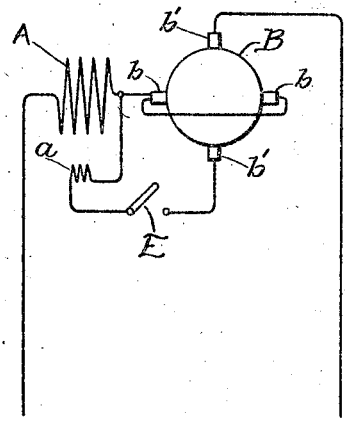

UNITED STATES PATENT OFFICE.

FRIEDRICH EICHBERG, OF BERLIN, GERMANY, ASSIGNOR TO GENERAL ELECTRIC COMPANY, A CORPORATION OF NEW YORK.

ALTERNATING-CURRENT MOTOR.

936,615.  Specification of Letters Patent.  Patented Oct. 12, 1909.

Application filed April 19, 1907. Serial No. 369,092.

*To all whom it may concern:*

Be it known that I, FRIEDRICH EICHBERG, a subject of the Emperor of Austria-Hungary, residing at Berlin, Germany, have invented certain new and useful Improvements in Alternating-Current Motors, of which the following is a specification.

My invention relates to alternating-current motors of the type in which the stator is provided with an inducing winding, and the rotor is short-circuited on the line of magnetization of the inducing winding by means of a commutator and brushes, and the excitation or cross-magnetization of the motor is produced by current supplied to the rotor through brushes displaced 90 electrical degrees from the short-circuiting brushes; and its object is to so arrange such a motor that it will operate at constant speed with a high-power-factor and efficiency. If a constant voltage is supplied to the exciting brushes of the rotor, the machine approximates constant speed, but the speed regulation is not close, because of the variation in the electromotive force induced in the rotor winding between the exciting brushes due to rotation in the field of the inducing winding and rotor short-circuit. This field decreases with increase of load, because of ohmic drop in the inducting winding, and in the rotor short-circuit, and consequently the electromotive force induced by this field in the rotor winding between the exciting brushes falls off. This induced electromotive force opposes the electromotive force of self-induction of the rotor circuit between the exciting brushes, and assists the voltage impressed on these brushes; and consequently its reduction decreases the amount of exciting current and also changes its phase in relation to the impressed voltage. Therefore the variation of speed with varying load is quite considerable, and at the same time the power-factor and efficiency are decreased.

By my present invention I superpose on the shunt excitation produced by the constant impressed voltage a series excitation which compensates for the drop in the exciting current.

My invention comprises as one of its features, employing the rotor winding for the series excitation, as well as for the shunt excitation.

My invention will best be understood by reference to the accompanying drawings, in which—

Figure 1:
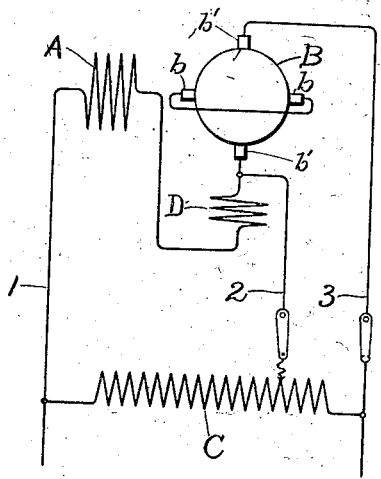
Figure 2:
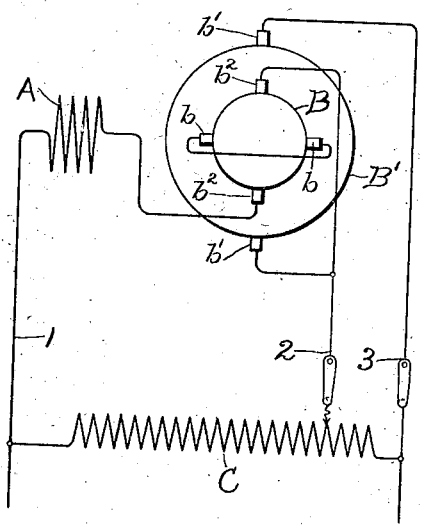
Figure 3:
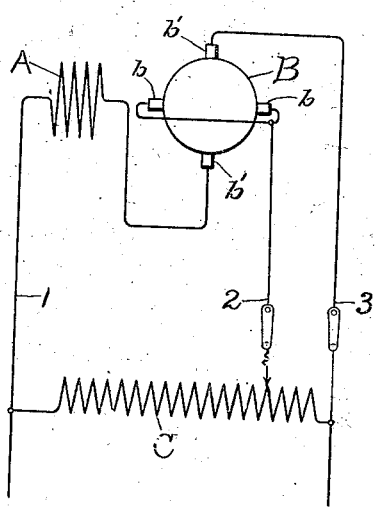
Figure 4:
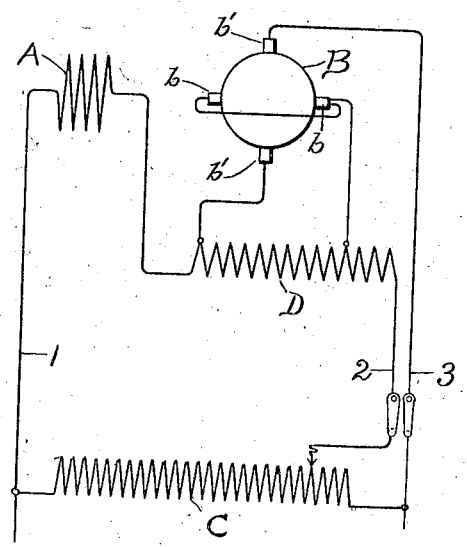

Figure 1 shows diagrammatically a motor arranged in accordance with my invention, with a series excitation obtained by means of a winding on the stator; Fig. 2 shows a modification in which the series excitation is obtained by means of an auxiliary rotor winding; Fig. 3 shows a further modification, in which the series and shunt excitation are obtained by different portions of the same rotor winding; Figs. 4 and 5 show modifications of the arrangement of Fig. 3; and Figs. 6 and 7 show modified arrangements for securing the constant voltage for the shunt excitation from the inducing winding itself.

In Fig. 1, A represents the inducing winding on the stator, B represents the rotor winding, which is short-circuited on the line of magnetization of the inducing winding by the commutator brushes $b$ $b$. $b'$ $b'$ represent brushes displaced 90 electrical degrees from the short-circuiting brushes, and connected to a source of constant voltage and carrying the exciting or cross-magnetizing current. For this source I have shown a transformer C connected across the supply-circuit, a portion of the winding of which is connected across the brushes $b'$ $b'$. D represents a winding on the stator adapted to produce a magnetization of the motor assisting that produced by the current flowing between the brushes $b'$ $b'$.

In operation the current flowing in the rotor winding between the brushes $b'$ $b'$ is determined by the amount of the impressed voltage, the self-induction of the winding, and the electromotive force developed in the rotor winding between these brushes, due to rotation in the field of the inducing winding A and the rotor short-circuit. This induced electromotive force opposes the electromotive force of self-induction, and assists the impressed voltage. As the load on the motor increases, increasing the current-flow in the inducing winding A and the rotor short-circuit between the brushes $b$ $b$, the field along the line of magnetization of the winding A, which is a transformer field, is reduced in amount because of the ohmic drop in the winding A and in the rotor short-circuit. Consequently, the electromotive force induced in the rotor winding between the brushes $b'$ $b'$, due to rotation in this field, is decreased, thereby decreasing the amount of current flowing through these brushes and the cross-magnetization of the motor produced thereby. The purpose of the exciting winding D is to compensate for this drop in the shunt excitation. Since this winding is in series with the inducing winding A, its magnetizing effect is proportional to the current in winding A, and consequently compensates for the drop in the shunt excitation.

In Fig. 2, in place of employing the stator winding D of Fig. 1, two rotor windings B and B' are employed; one of which, B', serves for the shunt excitation, and the other, B, for the series excitation. Extra brushes $b^2$ $b^2$ are supplied for this purpose. Either or both windings B or B' may be short-circuited on the line of the inducing winding A.

Fig. 3 shows a modification, in which different parts of a single rotor winding are employed for producing both the shunt and series excitation. The portion of the transformer C, which in Fig. 1, is connected across brushes $b'$ $b'$, is, in Fig. 3, connected between the upper brush $b'$ and the short-circuited brushes, so that the upper half of the rotor winding alone carries the current for the shunt excitation. The lower brush $b'$ is connected in series with the inducing winding A, so that the lower half of the rotor winding carries the current for the series excitation.

In Fig. 4 I have shown a further modification, by means of which the relative voltages impressed on the inducing winding A and on the rotor winding for the series excitation may be made anything desired. In this figure a transformer winding D is connected in series with the winding A, and points from this series transformer winding are connected to the lower brush $b'$ and to the short-circuiting brushes.

It may be noted that the motor may be caused to start as a series motor by opening either of the leads 2 or 3. For instance, if the lead 2 is opened, the motor starts as a series motor, with full series excitation,— that is, in Fig. 1 the current entering the inducing winding A passes through winding D and then through the entire rotor winding from the lower brush $b'$ to the upper brush, so that the entire rotor winding and the winding D assist in producing a strong field. If a weaker field, with less self-induction, is required at starting, by opening lead 3 the motor starts with a series excitation due to the field D alone; the rotor winding being idle, as far as producing cross-magnetization is concerned. Similarly, in Fig. 3, by opening lead 2 or 3, the motor starts as a series motor with all or with one-half of the rotor turns in the series circuit.

The arrangement shown in Fig. 5 is the same as that shown in Fig. 4, with the exception that the series transformer D is arranged to impress a higher voltage on the rotor than exists between the points of connection from the transformer to winding A and to the external circuit.

In place of the arrangement shown in Figs. 1 to 5, inclusive, for obtaining the shunt excitation, the arrangement shown in Fig. 6 may be employed. In this figure the shunt excitation is obtained by means of a tap from the inducing winding A, which is connected to the lower brush $b'$. In this figure the lower half of the armature serves for the shunt excitation; the upper half serving for the series excitation by means of the series transformer D. The switch E is provided for opening the shunt exciting circuit, so as to allow the motor to start as a series motor.

In Fig. 7 the lower half of the rotor winding is connected to an auxiliary stator winding $a$ in inductive relation to the main winding A. Thus, the shunt excitation is obtained from the main winding inductively, instead of conductively, as in Fig. 6. In this figure the upper portion of the rotor winding is shown connected directly in series with the inducing winding A, instead of through a transformer, as in Fig. 6.

Other modifications will readily occur to those skilled in the art, and consequently I do not desire to limit myself to the particular construction shown, but aim in the appended claims to cover all modifications which are within the scope of my invention.

What I claim as new and desire to secure by Letters Patent of the United States, is,—

1. In an alternating-current motor, an inducing winding on the stator, a rotor winding provided with a commutator and brushes short-circuiting it on the line of magnetization of the inducing winding, connections for impressing a substantially constant voltage on a part of the rotor winding at points on a line displaced 90 electrical degrees from the line of the short-circuit, and connections for supplying to another part of the rotor winding on the same line a current proportional to the current in the inducing winding.

2. In an alternating-current motor, an inducing winding on the stator, a rotor winding provided with a commutator and brushes short-circuiting it on the line of magnetization of the inducing winding, connections for impressing a substantially constant voltage on a part of the rotor winding at points on a line displaced 90 electrical degrees from the line of the short-circuit, a switch in said connections, and connections for supplying to another part of the rotor winding on the same line current proportional to the current in the inducing winding.

3. In an alternating-current motor, an inducing winding on the stator, a rotor winding provided with a commutator and brushes short-circuiting it on the line of magnetization of the inducing winding, a second set of brushes displaced 90 electrical degrees from the short-circuiting brushes, connections for impressing a substantially constant voltage on the rotor winding between one brush of the second set and the short-circuiting brushes, and means for supplying to the rotor winding through another brush of the second set and the short-circuiting brushes a current proportional to the current in the inducing winding.

4. In an alternating-current motor, an inducing winding on the stator, a rotor winding provided with a commutator and brushes short-circuiting it on the line of magnetization of the inducing winding, a second set of brushes displaced 90 electrical degrees from the short-circuiting brushes, connections for impressing a substantially constant voltage on the rotor winding between one brush of the second set and the short-circuiting brushes, a switch in said connections, and means for supplying the rotor winding through another brush of the second set and the short-circuiting brushes a current proportional to the inducing winding.

In witness whereof, I have hereunto set my hand this fifth day of April, 1907.

FRIEDRICH EICHBERG.

Witnesses:
 JULIUS RUMLAND,
 OSKAR SINGER.